UNITED STATES PATENT OFFICE.

AUGUST ALBERT, OF MUNICH, GERMANY.

METHOD OF PRODUCING NEW AROMATIC COMPOUNDS CONTAINING CARBONYLGROUPS WITH TRIVALENT ARSENIC.

1,425,931.     Specification of Letters Patent.     Patented Aug. 15, 1922.

No Drawing.     Application filed March 25, 1922. Serial No. 546,794.

*To all whom it may concern:*

Be it known that I, AUGUST ALBERT, a citizen of the Republic of Germany, and residing at Munich, Germany, Elisabethstrasse 46, have invented a new and useful Method of Producing New Aromatic Compounds Containing Carbonylgroups with Trivalent Arsenic, of which the following is a specification.

It is well known that the carbonyl group in aldehydes and ketones is very reactive and therefore aldehydes and ketones react very easily with reagents of the most varied nature. For example, it is generally known that these bodies can be easily reduced by a great variety of reducing agents. It is further known that the carbonyl group forms with bisulphites and hydrosulphites addition products which may be regarded as esters. Another example of the reactivity of the carbonyl group is given by Fossek (Wiener Monatschefte, vol. 5, p. 625, and vol. 7, p. 20) who shows that aldehydes, ketones, acid amids, etc., form phosphonic acids.

I have now discovered that it is possible to subject arsenic compounds such as those of the aromatic series which contain one or more carbonyl groups in non-cyclic linkage with an arsonic acid nucleus, to reduction in such manner that the arsenic group only is reduced. By the term carbonyl group in non-cyclic linkage, I mean, a carbonyl group contained in a side chain. In this manner, for example arsonic acids of the type $R-As=O_3H_2$, where R is an aromatic group containing one or more carbonyl groups, are reduced to the corresponding oxides $R-As=O$, and these oxides can be further reduced to the arseno compounds $R-As=As-R$, in non-cyclic linkage, without the carbonyl groups having been attacked.

For conducting this selective reduction of pentavalent arsenic in organic compounds, sodium hydrosulphite, phosphorous trichloride, phosphorous acid and halogen iodide, sodium bisulfite and the like are especially adapted.

The new substance containing trivalent arsenic produced in the aforesaid manner possesses valuable therapeutic properties and from it can be prepared derivatives which are effective in the control of the *Bacillus trypanomiasis* and the *Bacillus spirochasta pallida.* To illustrate different methods of practising my invention the following examples are given.

1. 5 grams benzaldehyde-arsonic acid

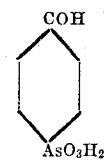

are dissolved in 44 ccm. normal sodium hydrate (=2 molecules) and thereto are added 80 ccm. of water. To this solution is added a solution of 50 gms. sodium hydrosulphite and 10 gms. chloride of magnesia in 200 ccm. of water and this mixture is stirred 1½ to 2 hours at a temperature of about 60° C. The desired arseno benzol dehyde separates out. It is then filtered by suction and washed and dried in vacuo. The resulting product has a dark color, it decomposes at about 260° C.

2. 6.6 gms. 1-cxy-6-nitro-2butyro-4-ar-

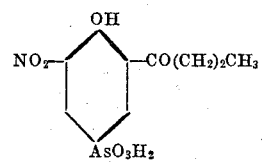

sonic acid are dissolved in 100 ccm. normal NaOH, which solution is diluted with 70 ccm. water. This solution is added with stirring to a solution of 13 gms. chloride of magnesium and 76 grams of sodium hydrosulfite in 330 ccm. water. It is stirred at a temperature of about 60° for 1 to 1¼ hours. The precipitate is filtered with suction, washed and dried in vacuo. The arseno benzol so obtained gradually darkens at about 100° C. without melting.

3. 1 gm. p-acetonphenonarsonic acid is

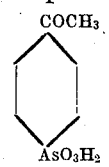

poured into a solution of 5 ccm. sodium bisulphite. By heating with a free flame the substance is for a moment dissolved but then at once the separation of the arsenic oxide begins. The reaction is completed by heating for half an hour on the water bath. It is then filtered with suction, washed and dried on a piece of porous earthenware. The arsenic oxide forms a sodium salt difficult to dissolve in normal NaOH, but it may be dissolved by addition of water. By means of a solution of ammonium chloride the arsenic oxide can be separated again out of this solution as a white voluminous precipitate. The oxide decomposes at a temperature of about 260–265° to a dark brown mass.

4. 1.2 gms. 1-oxy-6-nitro-2-acetophenon

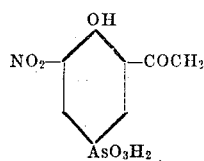

arsonic acid is dissolved in 24 ccm. water and 8.8 ccm. normal sodium hydrate and filtered. 0.4 gm. potassium iodide and 16 ccm. sulphuric acid (1.5) are added to this solution and then sulphur dioxide is passed into the solution for about 1 hour, meanwhile cooling the solution with water. The mixture is then allowed to remain in the vessel for 24 hours, the arsenic oxide so produced is then filtered with suction and dried on a piece of porous earthenware. The arsenic oxide is redissolved and separated by a solution of ammonium chloride. At a temperature of about 230° to 235° the arsenic oxide decomposes to a dark brown mass.

Claims:

1. Process of preparing an aromatic compound containing trivalent arsenic acid and a carbonyl group which consists in treating with a reducing agent an aromatic compound which contains a carbonyl group in non-cyclic linkage and an arsonic acid group attached to the benzol ring.

2. Process of preparing an aromatic compound containing trivalent arsenic acid and a carbonyl group which consists in treating with sodium hydrosulphite an aromatic compound which contains a carbonyl group in non-cyclic linkage and an arsonic acid group attached to the benzol ring.

3. As a new compound, a substance containing the group R—As=, in which R comprises an aromatic group to which is attached a carbonyl group.

4. As a new compound, 1—4 arseno benzaldehyde of the general structure

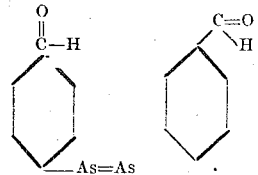

In testimony whereof I have signed my name to this specification in the presence of two subscribing witnesses.

AUGUST ALBERT.

Witnesses:
ALEXANDER DE SOTO,
ALESER V. PHILIPPOFF.